US012791363B1

(12) United States Patent
Kirby et al.

(10) Patent No.: US 12,791,363 B1
(45) Date of Patent: Nov. 10, 2026

(54) SYSTEM AND METHOD FOR ADAPTIVE PATTERN GENERATION FOR A SENSOR

(71) Applicant: Palladyne Corp., Salt Lake City, UT (US)

(72) Inventors: Richard Kirby, Heber City, UT (US); Fraser M. Smith, Salt Lake City, UT (US)

(73) Assignee: Palladyne Corp., Salt Lake City, UT (US)

( * ) Notice: Subject to any disclaimer, the term of this patent is extended or adjusted under 35 U.S.C. 154(b) by 0 days.

(21) Appl. No.: 19/242,780

(22) Filed: Jun. 18, 2025

(51) Int. Cl.

| | |
|---|---|
| ***G01D 5/36*** | (2006.01) |
| ***G01B 11/00*** | (2006.01) |
| ***G01B 11/16*** | (2006.01) |
| ***G01B 11/27*** | (2006.01) |
| ***G01D 5/26*** | (2006.01) |
| ***G01L 1/24*** | (2006.01) |
| ***G01P 3/36*** | (2006.01) |
| ***G01P 15/093*** | (2006.01) |
| ***G01P 15/18*** | (2013.01) |
| ***G01P 21/00*** | (2006.01) |
| ***G06T 7/73*** | (2017.01) |

(52) U.S. Cl.
CPC .......... *G01D 5/366* (2013.01); *G01B 11/002* (2013.01); *G01B 11/272* (2013.01); *G01L 1/24* (2013.01); *G01P 3/36* (2013.01); *G01P 15/18* (2013.01); *G06T 7/74* (2017.01); *G01B 11/16* (2013.01); *G01B 11/167* (2013.01); *G01D 5/26* (2013.01); *G01P 15/093* (2013.01); *G01P 21/00* (2013.01)

(58) Field of Classification Search
CPC ........ G01D 5/366; G01D 5/26; G01B 11/272; G01B 11/167; G01B 11/002; G01B 11/16; G01L 1/24; G01P 3/36; G01P 15/18; G01P 15/093; G01P 21/00; G06T 7/74
See application file for complete search history.

(56) References Cited

U.S. PATENT DOCUMENTS

| | | | | |
|---|---|---|---|---|
| 6,099,125 | A * | 8/2000 | Webb | A61B 3/1015 351/211 |
| 9,245,916 | B2 | 1/2016 | Smith | |
| 9,651,365 | B2 | 5/2017 | Smith | |
| 9,848,122 | B2 | 12/2017 | Smith | |
| 9,851,196 | B2 | 12/2017 | Smith | |
| 9,874,433 | B2 | 1/2018 | Smith | |
| 10,077,978 | B2 | 9/2018 | Smith | |
| 10,197,383 | B2 | 2/2019 | Smith | |
| 10,228,234 | B2 | 3/2019 | Smith | |
| 10,451,404 | B2 | 10/2019 | Smith | |
| 2016/0335778 | A1* | 11/2016 | Smits | H04N 23/56 |
| 2017/0363464 | A1* | 12/2017 | Shafer | G01D 5/30 |
| 2023/0251081 | A1* | 8/2023 | Kirby | G01P 15/18 |

* cited by examiner

*Primary Examiner* — Jennifer D Bennett
(74) *Attorney, Agent, or Firm* — Thorpe North & Western, LLP

(57) ABSTRACT

Technology is described for adaptive pattern generation for a sensor. The method can include emitting an optical output with a pattern using an emitter. A transformation for the pattern can be detected as sensed by the sensor. Another operation may be emitting a revised pattern based in part on the transformation detected in the pattern. Sensor output from the sensor may be obtained based at least in part on the revised pattern.

35 Claims, 8 Drawing Sheets

SYSTEM AND METHOD FOR ADAPTIVE PATTERN GENERATION FOR A SENSOR

BACKGROUND

Displacement sensors can support a wide variety of applications in which measurement of the size, length or amount of something can be calculated based at least in part on a displacement measurement. Displacement sensors find practical application by being used to measure linear displacement and rotation angle, rate of linear displacement and rotation, force including multi-axes forces, torque, moments, strain, load, acceleration in one or more directions, inertia and pressure, along with many other practical applications.

DETAILED DESCRIPTION OF THE PREFERRED EMBODIMENTS

Figure 1:
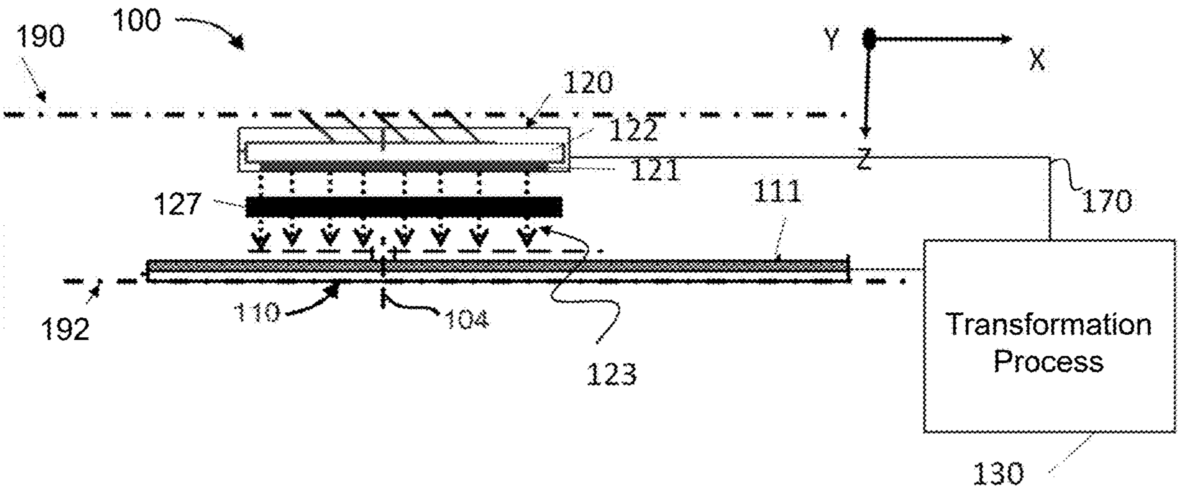
FIG. 1 is a diagram illustrating an example cross-sectional side view of a displacement sensor.

Reference will now be made to the examples illustrated in the drawings, and specific language will be used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

This technology provides a high-resolution sensor that can generate and use adaptive patterns. More specifically, the sensor can provide adaptable and automatic pattern generation for optically based displacement, force and torque measurement sensors.

The following terms are defined here:

Adaptable pattern generation: a pattern which changes its visual configuration and/or intensity to improve sensor performance.

Automatic pattern generation: a pattern which changes according to a pre-defined sequence of visual configurations.

DOF: Degrees of Freedom that the sensor is capable of measuring, this can be up to six.

Sensor resolution: This is the minimum change in the displacement, force or torque that the sensor is capable of perceiving. It varies by DOF and sensor orientation. The minimum resolution can be limited by noise from the environment, but can also be limited by the resolution of the conversion between analog and digital representations. Not all applications of this technology may include analog-to-digital conversion, but when it does, the term Least Significant Bit (LSB) refers to the smallest step between measurements that the analog-to-digital conversion process can represent.

Sensor gain: This is the ratio between the sensor input (e.g. change in displacement, force, or torque) and the sensor output which is typically a change in the number of photons impacting a light sensitive surface, but measured via a change in voltage or current. The sensor gain varies by DOF. All else being equal, the higher the gain, the higher the Signal-to-Noise Ratio (SNR) and the better the sensor resolution.

SNR: Signal-to-Noise Ratio. This is the output of the sensor (the signal) relative to the noise inherent in the measurement. The SNR can differ from one DOF to another and is related to the sensor gain.

Linearity: This is how the gain changes from one extreme to the other extreme of each axis along which the sensor measures displacement. A sensor output is linear if the ratio between the output and the input (the gain) stays constant from one extreme to the other of each axis. This is the same as having a constant gain from one extreme to the other of each axis. A sensor is non-linear if the gain changes based on position or something else. Typically, non-linear sensors require extensive calibration and the SNR changes depending on where along the axis the measurement is taken. For these reasons, linear sensors are much more desirable than nonlinear sensors.

In optically based displacement sensing, a photodetector or image sensor (e.g., with one or more sensing elements), senses the position of a pattern that is optically output by an emitter which can emit light. As the pattern moves relative to the image sensor with sensing elements, the output of the image sensor changes proportionally to the change in position of the image sensor relative to the pattern. The output of the image sensor can then be converted into displacement using the appropriate conversion process.

The design of the pattern as well as how the pattern is orientated in the field of view of the sensing elements affects the sensor gain, which in turn affects the sensor SNR, which in turn affects the resolution of the sensor output as well as the linearity of the sensor output. Why this is the case will be explained in detail later in this disclosure. The use of a predefined pattern for an optical displacement sensor may predispose the sensor to having higher resolution measurements in one or several axes or when the pattern is in certain positions relative to the sensing element and lower or no resolution in other positions or orientations. This may lead to non-linearity in certain axes when certain displacements occur (e.g. rotation typically causes non-linearity in the translation axes).

In previously existing optical displacement sensors that may use a predefined pattern, the sensor has widely varying gains, SNR, and resolution dependent on which axis the displacement occurs and where within the sensing element frame the pattern is located. Additionally, depending upon the axis of displacement/rotation, non-linearity may occur using pre-defined patterns.

The present technology can avoid these issues by using an adjustable emitter which may use a display technology like an OLED (organic light-emitting diode), quantum dot, or similar light-emitting element (LED) array, to generate an optical pattern that can be adapted, modified or transformed in real-time through a feedback mechanism to the emitter. Modifying or adapting the pattern may dynamically improve the use of the pattern based on the displacement that is being observed and the needs of the application.

FIG. 1 is a diagram illustrating an example side view of a cross-section of a displacement sensor 100. The displacement sensor may comprise one or more sensors 110 or sensing elements, one or more emitters 120, one or more feedback mechanisms 170, and a transformation process 130. The emitter may also be called an optical pattern generator, a light intensity pattern object, an optical pattern emitter or an optical emitter. The displacement sensor 100 may also include the sensor 110 or sensing element with a light intensity measuring surface 111.

In one embodiment, the displacement sensor 100 has at least two operating elements and that includes the sensor 110 which is an optical sensor and the emitter 120 or the optical pattern generator. The emitter 120 allows a pattern to be output to the optical sensor 110. The two components are free to move with respect to each other (e.g., up to 6 degrees-of freedom (DoF)). One component, such as the emitter 120, may be attached to one portion of a mechanical joint and the sensor 110 may be attached to a second portion of a mechanical joint. The emitter 120 may have the ability to display changed pattern outputs on the light source 122 in ways that the light source 122 becomes a variable and contributes to sensor performance.

In FIG. 1, when displacement occurs between the two main components of the sensor, the sensor 110 for sensing light and the emitter 120, the output of the sensor 110 changes proportionally to the change in displacement. As displacement occurs between the detector 110 and the emitter 120, the pattern from the light detector may change orientation and location in a sensor or light detector frame. The transformation process 130 may include a process and processor with software that is machine learning (ML) or artificial intelligence (AI) capable. The transformation process 130 may include a set of sensing rules and the previous displacement magnitudes and orientations to transform or modify the pattern. The pattern modification or transformation may use the most recent actual displacement. Accordingly, the processor or transformation process 130 (e.g., adaptive means) can obtain information frequently from the sensor device and use that information to adapt or transform the pattern in real time.

The pattern that is displayed on the emitter 120 can be improved using machine learning (ML). For example, the pattern may be an adaptive pattern. In many existing types of machines and sensors (e.g., for robots or other manufacturing machines), the same types of movements are used repetitively over time. So, the transformational process may pick a better pattern than a square (e.g., cross hatching or a symbol) for a specific movement. This may be because a square does not perform as well when the shape is centered but it performs better when the square is off center.

In addition, the transformation process 130 may adapt the pattern to maximize the ratio between the input and output (i.e., sensor gain) while also maximizing the signal-to-noise ratio (SNR) along the desired axis or axes consistent with the provided rules and a goal of producing a linear output. The device may also comprise image formation optics 127. The image formation optics 127 may be a lens or a micro-lens array.

The sensor 110 (e.g., sensing element(s)) and emitter object (e.g., pattern generator) may be capable of measuring up to 6-DOF, each DOF having potentially a different SNR, different ratio between the input and output, different useable resolution, and different linearity characteristics.

The emitter 120 can serve as a 'proxy' target object, i.e., an object whose change in position and/or orientation is being determined by the sensor 110 or imaging device to determine displacement of another object or structure to which the emitter 120 is rigidly affixed. Thus, the emitter 120 is an integral component of the sensor device 100. The emitter 120 comprises one or more light sources 122 and a pattern forming substrate 121 configured as a multi-dimensional array of light intensity pattern portions that defines the light intensity pattern of the emitter 120. The transformation process 130 may generate a pattern based on the changes detected to the pattern. This may include moving or rotating the pattern, supplying a new pattern or turning on or off parts of the pattern sent to the emitter 120.

The emitter 120 may emit light 123, which propagates generally along a longitudinal axis (z axis at 104) that is generally perpendicular to the pattern forming substrate 121 and light measuring surface 111. Each respective emitter portion propagates light 123 in which the light intensity varies accordingly. In cross section, the light intensity varies according to the intensity pattern conferred by pattern-forming substrate 121.

In some embodiments, the light intensity measuring surface 111 can comprise an array of photo-sensing elements, each of which responds in accordance with intensity of light to which it is exposed. In one embodiment, light intensity measuring surface 111 senses an image as an array of photo-sensor charge values that vary from one photo-sensing element to the next in accordance with corresponding light intensity patterns to which light intensity measuring surface 111 is exposed.

The image formation optics 127 (e.g., a micro-lens array) comprises an array of micro-lenses disposed between the emitter 120 and light intensity measuring surface 111 of the imaging device 110. The image formation optics 127 can be arranged with respect to the emitter 120 such that each respective micro-lens views a corresponding, respective portion of emitter 120 as a sub-image. In that sense, image formation optics 127 form an array of sub-images. The image formation optics 127 can focus the array of sub-images onto the light-intensity sensing surface 111 of the detector 110, forming thereon a sensed image from the emitter 120.

The detector 110 can capture images from the light-intensity sensing surface 111 to produce a sequence of captured images over a time during which displacement occurs or may occur. The detector 110 provides at least a first captured image (the 'reference' image) to the transformation process 130 and at least a second captured image (the 'sensed' image). The transformation process 130 may measure displacement by registering (aligning) the sensed image to the reference image of light intensity pattern object 120.

In use, the emitter 120 (e.g., light intensity pattern object) can be rigidly affixed to a first structure 190 and the detector 110 including light measuring surface 111 can be rigidly affixed to a second structure 1314. In some embodiments the first structure 190 and second structure 192 are separate structures, each of which has up to six degrees of freedom of motion. In other embodiments first structure 190 and second structure 192 can be different structural portions of the same structure. The sensor 100 measures relative displacement of the first structure 190 with respect to the second structure 192 by measuring the relative displacement of the emitter 120 with respect to the sensor 110.

In one embodiment, the sensor 100 may include a flexible support structure that facilitates relative movement between emitter 120 and the sensor 110 in at least one degree of freedom so as to allow relative movement therebetween.

In another embodiment, a substrate or mask is disposed on the support structure such that the support structure serves as pattern forming substrate 121 of emitter 120. In one example, the pattern forming substrate 121 is coated with a material that fluoresces, or the pattern forming substrate is made from a material that fluoresces, such that subjecting the pattern forming substrate 121 to light from a light source causes the pattern forming substrate 121 to excite and fluoresce (emit light), wherein light emitted from the pattern forming substrate 121 comprises the light intensity pattern for the emitter 120.

In further embodiments, the emitter 120 may include a mask that comprises opaque and transparent areas, i.e. light transmitting areas. In some embodiments, the mask may be fabricated using lithographic processes such as those employed in the semiconductor fabrication industry. Light from a light source may pass through the transparent areas while being blocked by the opaque areas, forming a light intensity pattern An emitter 120 may be formed using one or more light emitting diode (LED) arrays. In some embodiments, the LED arrays may include organic LEDs (OLEDs). In some embodiments, a light pattern may be formed using one or more quantum dot arrays. A combination of LED arrays and quantum dot arrays may be used. In another embodiment, the light intensity pattern may be formed by an array of light valves. The array of light valves may act as controllable shutters to selectively allow light to transmit through or to block the light. These valves can also allow some percentage of light through between entirely blocking light, in other words 0% transmissibility, and allowing all light, in other words 100% transmissibility. In one example, the light pattern may be formed by a liquid crystal display (LCD). The LCD may use a back light and a layer of valves to control the light that is emitted per valve, and thus the light intensity pattern.

The light pattern generated can be any shape that may be imagined that is equal to or smaller than the emitter. In one example, the size of the emitter may be between 1 to 1000 pixels on each size. Even when 1000×1000 pixels is used, this may only be on the order of a physical size of a postage stamp. Thus, an emitter may be used that is small square, circle, or oval or any other geometric shape or irregular pattern. The sensors illustrated in FIGS. 2-5 have 4 sensor pixels or 4 physical sensor elements.

In this technology, the emitter is capable of changing the pattern during sensor use (e.g., in real-time) under processor and transformation process 130 control via a feedback mechanism or process. The changing of the pattern may occur independently of the feedback mechanism. This means the pattern may be changed without a feedback loop to a number of useful results explained later.

There are a variety of different configurations/orientations of the sensor 110 or sensing component that may work with respect to the emitter 120. For example, the emitter may be spatially separated from the sensing component or the emitter may be in contact (directly or via a transparent medium) with the sensing component.

The SNR (signal-to-noise ratio), measurement resolution, and linearity of the output of the sensor or optical sensor may be dependent on the shape and orientation of the pattern as well as the axis along which displacement or rotation occurs.

Figure 2:
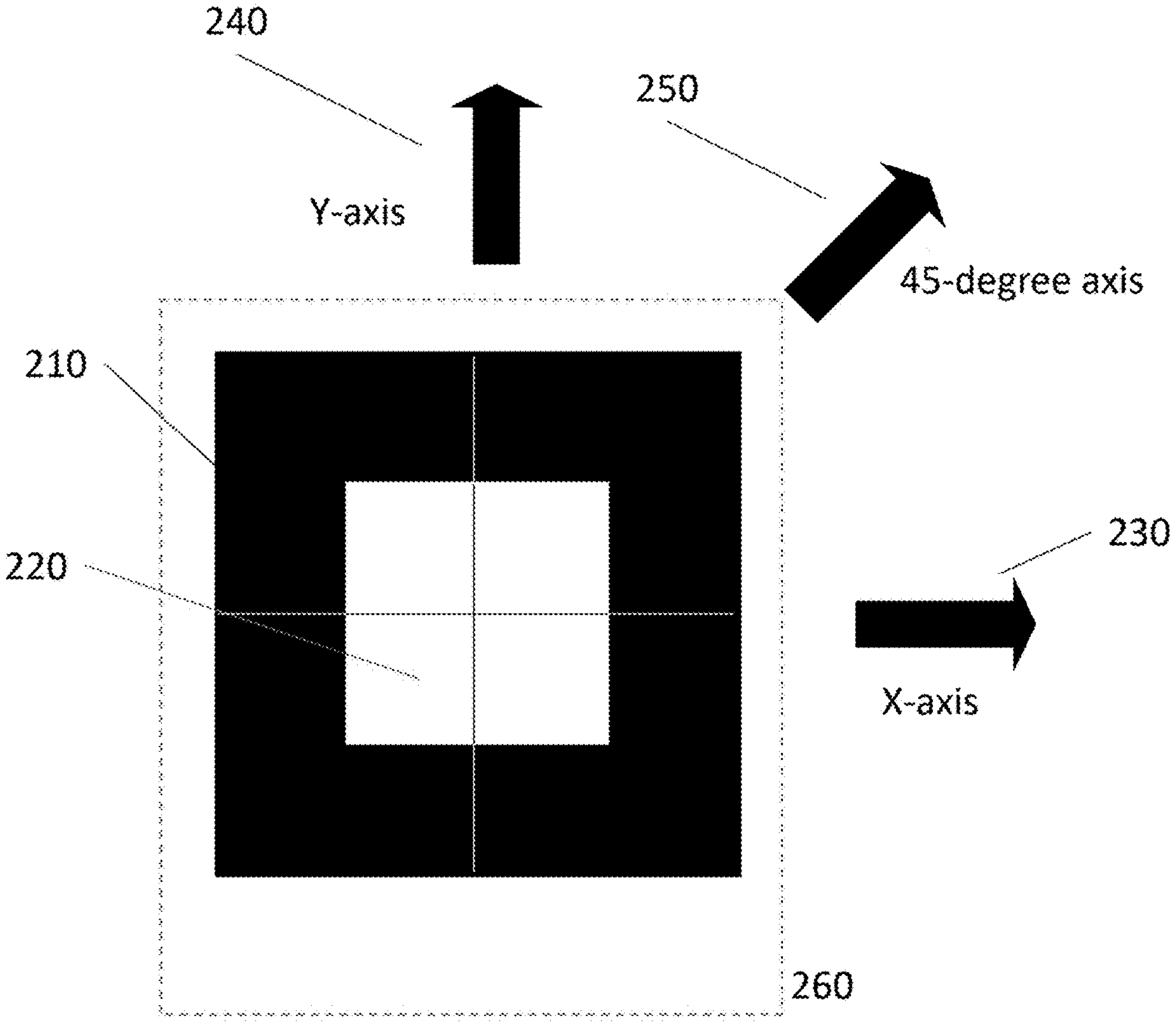
FIG. 2 is an example of a full sensing component frame of the sensing component.

In FIG. 2, an example of a full sensing component frame 210 of the sensing component is displayed. Within that frame is the pattern 220 from the emitter. Translation of the square pattern along the x-axis 230 or the y-axis 240 produces high SNR and measurement resolution, but translation of the square pattern along the 45-degree axis 250 produces a highly non-linear SNR and measurement resolution. In FIG. 2, the illustrated area 260 includes both the sensing component frame and the orientation and position of the pattern within the sensing component frame. The pattern may rotate orthogonally around the z-axis as compared to the x-axis and γ-axis. Rotation may also occur between the sensor element and emitter element in a particular axis. If rotation is involved in using the sensor, a square pattern, like the one in FIG. 2, may become a diamond pattern on a given axis and have the same undesirable output characteristics as the 45-degree axis.

FIG. 2 illustrates the use of four analog photodetector elements in four quadrants. The system may perform measurements between adjacent photodetector elements to determine whether and how a pattern has moved across the photodetector elements. This array of four sensors that are analog devices provide an output that is analog. This allows the system to perform differencing right at the sensor, which makes the comparison between sensor elements faster. The system does not need to send the photodetector values to a processor because the sensor array just subtracts two or more signals from each other in analog form. Such comparisons are fast enough that the sensors may operate in the megahertz (MHz) regime and still provide the comparisons quickly enough. Then because the sensor elements (e.g., pixels) are relatively big (in electronic terms), the sensor elements have a much lower signal-to-noise problem than compared to individual pixels on a 10-megapixel array of sensors, where each of those pixels or sensors have lots of noise. This example embodiment has very little noise when using four analog sensors.

The analog sensors shown here can be of any size or scale depending on the size of the sensor device. In addition, any number of analog sensors can be used as desired. The photo detector pattern can also vary and the photo detector pattern used can be customized to the application for which the sensor device is being used. For instance, the photo detectors pattern can be modified for rotation or translation of the sensor device in X and Y coordinates or for getting a higher resolution measurement. In certain circumstances, the four-quadrant arrangement is simple to use and manufacture, and the four-quadrant arrangement is easy to understand from a Cartesian perspective. Digital sensors may also be used in desired applications.

The emitter can translate and rotate the pattern with respect to the sensors so then the pattern can be reset to the pattern's original location and remove the translations and rotations so sensing can occur on the next cycle again. The system can also reconfigure the pattern on the emitter. In other words, in the emitter various parts of the pattern may be turned on and turned off to move the pattern or to obtain additional information about location. Assume there is an array of one thousand by a one thousand LEDs or quantum dots. The system can select which pixel emitter elements are on and which ones are off. By definition, the sensor pattern will not change but the light emission can change (e.g., which pixel emitters are on or off), so that best use of "sensor pattern" can be applied. The 1000×1000 array cannot be physically changed, but the system can change which pixel elements are lighted to give a shape to the sensor. The sensor made out four photo detectors does not change but what changes is which pixel emitter elements of the illumination array are chosen to be illuminated.

On the light emitter, one goal is to obtain a good continuum of light. This means that if the light emitter were one emitter but the light emitter was perfect in intensity across the whole area of the light emitter, then only light versus dark could be analyzed on the sensor. Because the creation of a perfect continuum of light is challenging, this technology can use many small emitters on the emitter. The emitter may be made in any number of ways, but the goal is to make an emitter that has more uniformly emitted photons, which is challenging. So, the emitter is made of arrays of emitters to try to make any Gaussian distribution of intensity as small as possible. One way to obtain uniformity is to have many of the same small emitters and the quality of each one of those is then subsumed in the array that becomes a relatively uniform light source.

Figure 3:
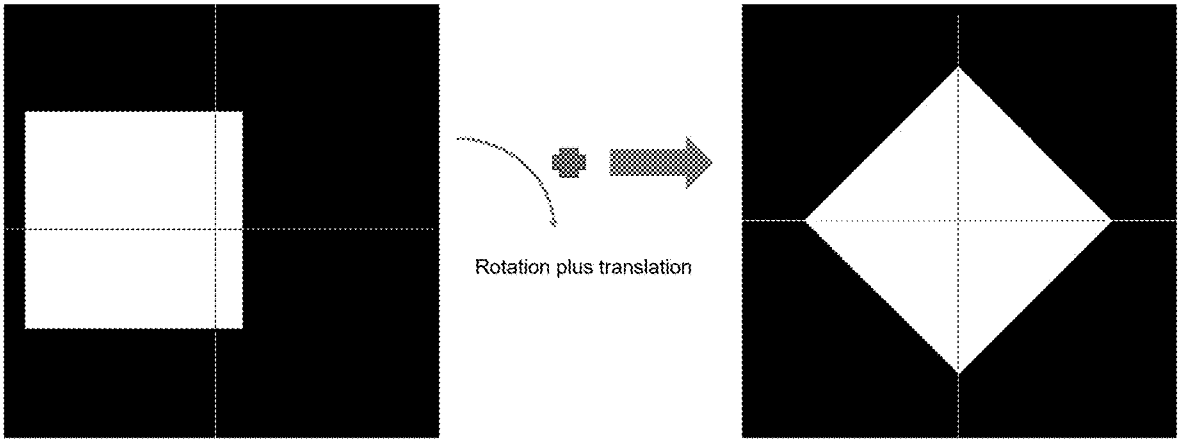
FIG. 3 is a diagram that illustrates an example of a pattern to which a translation component and rotation component may be applied.
Figure 4:
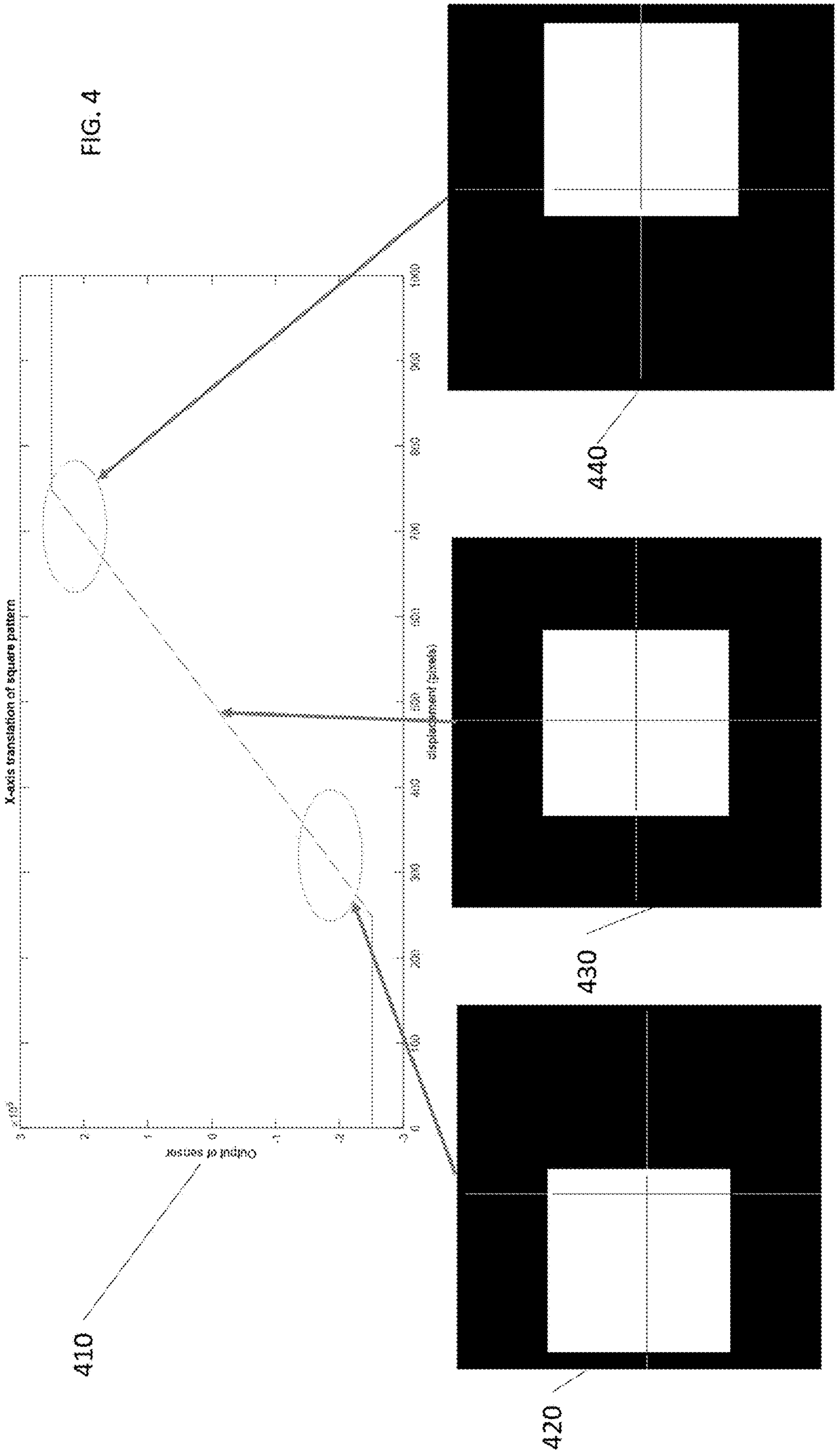
FIG. 4 is a diagram illustrating displacement of a square pattern along the x-axis along with the associated output.

FIG. 3 is a diagram that illustrates an example of a pattern to which a translation component and rotation component is applied. If the rotated pattern is translated more on the X-axis or the Y-axis, then a highly non-linear output (e.g., current or voltage) from the sensor may occur. FIG. 4 is a diagram illustrating displacement (i.e., translation) of a square pattern along the x-axis (420, 430, and 440) along with the associated output 410. The output is linear throughout the range of the sensor with a high gain of 1000.

Figure 5:
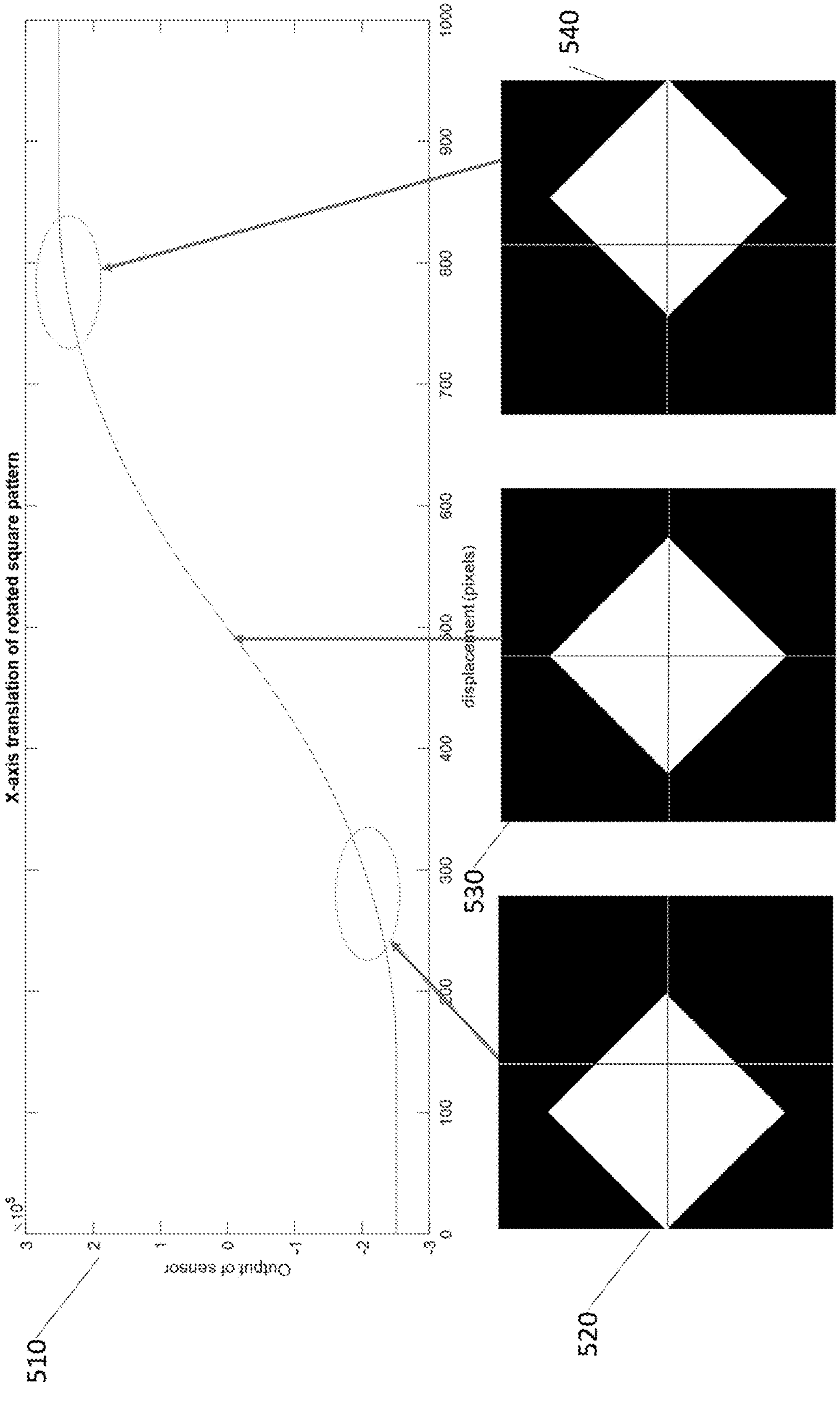
FIG. 5 illustrates displacement of a square pattern rotated 45 degrees along the x-axis along with the associated output.

FIG. 5 shows displacement of a square pattern rotated 45 degrees along the x-axis (520, 530, and 540) along with the associated output 510. This square pattern rotated 45 degrees along the x-axis is equivalent to translation along the 45-degree axis described above. Along the 45-degree axis if the pattern is centered 530, then the SNR and measurement resolution is slightly better than along the x- or y-axis, but if the pattern is off center (520 and 540), the SNR and measurement resolution drops to zero for a highly non-linear, very low SNR, and very low resolution (zero at the extreme) output.

Figure 6:
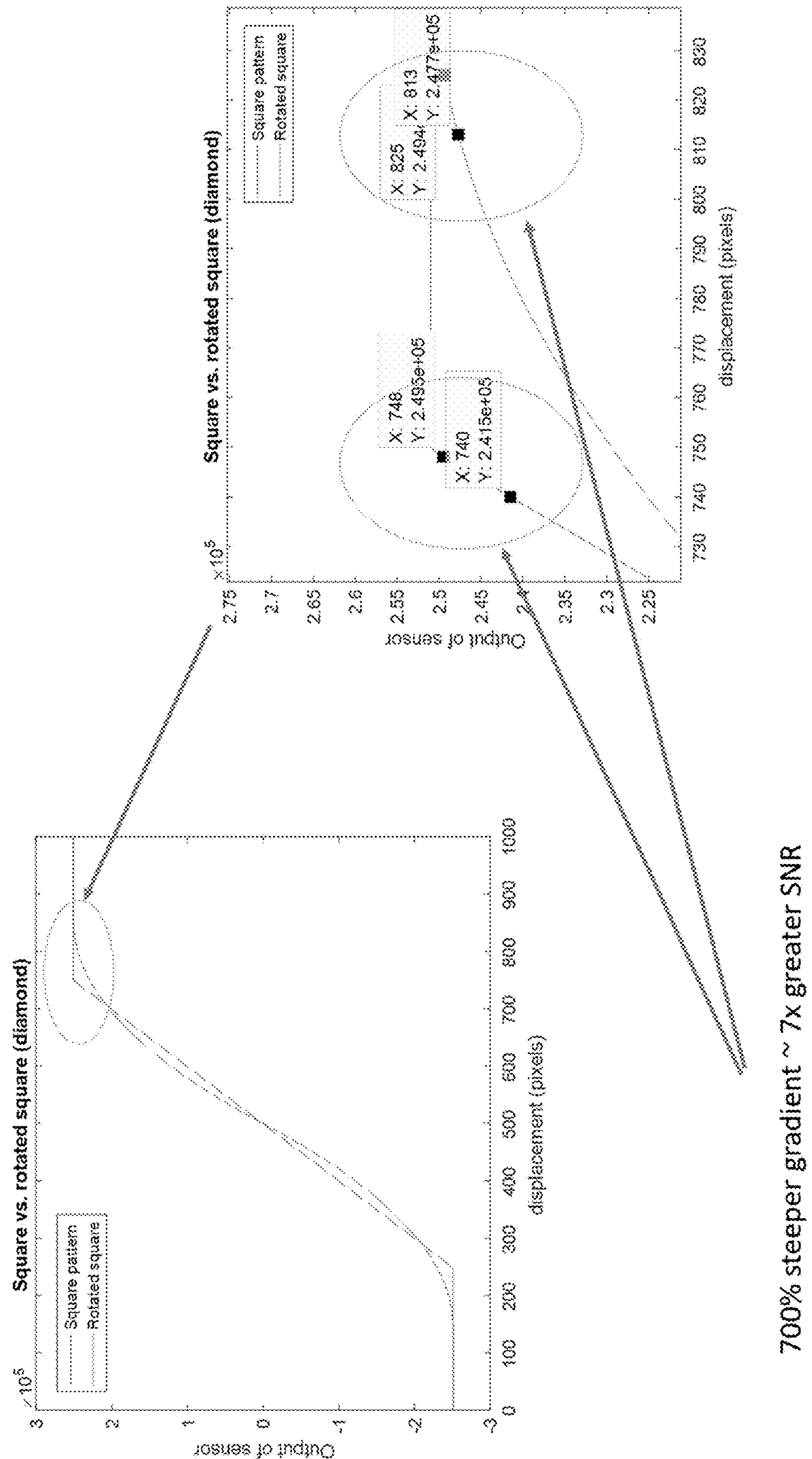
FIG. 6 illustrates the output of the examples shown in FIG. 4 and FIG. 5 overlaid with details of the non-linearity, loss of gain and the resulting loss of SNR and resolution.

This graphical description of what the sensor might receive illustrates better and worse gain. The slope of the pattern in the case of FIG. 5 determines the gain or the ratio between the input and output. The lower slope of the edge of the diamond provides a poor signal-to-noise (S/N ratio). The voltage output gain in center of the graph is 3 times of the poor signal-to-noise ratios. However, the voltage output gain at the low end is 0.5 and at the high end is 1.5. The impact on the S/N is bad when slope of the pattern edges is low along the axis of translation. The resolution in the area with good gain may be 1 nanometer (nm). When the S/N becomes bad, then the resolution might drop to 100 microns FIG. 6 illustrates the output of the scenarios shown in FIG. 4 and FIG. 5 overlaid with details of the non-linearity, loss of gain and the resulting loss of SNR and resolution. The take-away from this figure is that a sensor with a fixed pattern will result in very low or no resolution measurements in certain positions or orientations. The effect of this can be minimized by not using the sensor in situations that result in this loss of gain and non-linearity, but that also significantly reduces the usefulness of the sensor. Instead, the present technology can modify or transform the pattern to make the sensor more useful overall.

Figure 7:
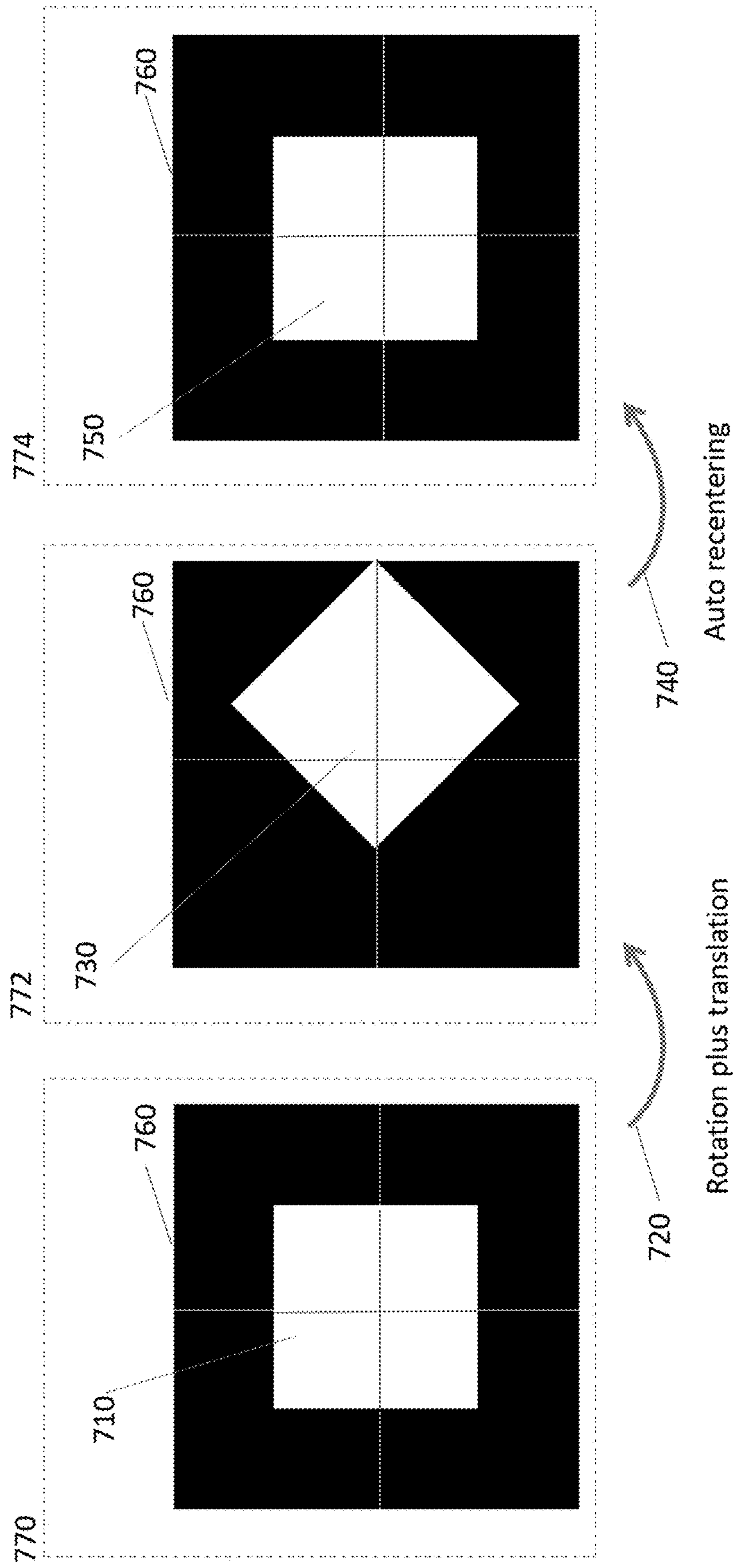
FIG. 7 illustrates a hypothetical starting position or a first position of the pattern within a light detector frame.

FIG. 7 illustrates an example starting position or a first position 770 of the pattern 710 within a light detector frame 760. Between the first position 770 and second position 772, the emitter component from FIG. 1, rotates and translates 720, changing the position of the pattern 730 in the second frame 772. This is a physical change due to the motion of the sensor, not a command from the detection service.

The adaptable pattern in a first position 770 may initially be a centered square 710 in the sensing component frame 760. Due to the displacement applied to the sensor, which in this case is rotation plus translation 720, the square pattern 710 becomes an offset diamond 730 in the second state 772. A transformation service or transformation process (e.g., a machine learning process) may analyze the change in position and orientation of the pattern and send a feedback signal to the emitter, which then provides an adjusted 740 pattern that is a centered square 750 once again. The adjustment between the second state 730 and the third state 750 occurs immediately and the change in position and orientation is known to the transformation service that detected the change and which controls the emitter so no information is lost.

This change in position and orientation reduces the SNR and resolution of the sensor. This reduction in resolution is detected by the transformation process 130 or transformation service in FIG. 1 by detecting the change in slope and other characteristics depending on the sensor type (e.g. photodetector balance between cells or the actual image from an image sensor), see FIGS. 4 and 5, plots 410 and 510. The transformation service 130 or processor in FIG. 1, may send a signal to the emitter to re-center and re-orient the pattern to the desired position, in this case the third state 774 that is also the new starting position (e.g., in a null based sensor mode), as in FIG. 7. The difference between the previous location and orientation of the pattern 730 and the new position and orientation of the pattern 750 are accounted for in the computation of the next change in displacement and orientation by the transformation service 130.

FIG. 7 illustrates just one example of an unlimited number of possible pattern and displacement combinations. Any number of other pattern and displacement combinations may be used or conceived of using human generated variations or AI generated possibilities. In order to keep the sensor output linear, the transformation process or service can ensure that the pattern has parallel edges to the axis of translation or rotation. This can also be described as the ratio between the output and the input having a constant slope or gradient. If translation and rotation occur simultaneously, the edges can still be parallel, but may be parallel curves as opposed to parallel straight lines.

The emitter as well as the sensors or sensing components may have color generation and detection capabilities. This ability to use color can augment the ability to generate patterns using multiple colors (e.g., light frequencies) as well as increase the sensitivity of the sensing component to perceive a wider array of patterns. Additionally, by using the frequency response characteristics of the sensors or sensing components (which has an output intensity—current or voltage—that is frequency dependent), very slight changes in color can be used to shift the sensitivity of the receiver to provide more precise control over the intensity.

In addition to the above-described pattern adaptation, automatic pattern sequences may be output (or "played") for specific purposes. An automatic pattern sequence playback may allow the sensor to perform numerous functions including self- or auto-calibration (e.g. to find and calibrate pixels that produce different light intensities) or to perform self-tests (e.g. to ensure all pixels are illuminated when instructed to turn on and extinguished when instructed to turn off).

The automatic adaption may be useful in an embodiment with four analog sensors because the four quadrants of the photo detector may not be exactly the same due to manufacturing. Variances in the sensors can be determined by turning on and off pixels in each of the quadrants in an automatic sequence of events. This allows the emitter (e.g., display) and the sensor to be calibrated together. For example, where 1/100 of the pixels on the emitter are turned on, then a 1% output may be expected. But the sensors might get a. 99% or 1.01% output. A similar calibration may be performed in different places along each of the quadrants. This allows the sensor to self-calibrate through a series of automatic pattern sequences to account for differences in pixels or sensor elements.

In another example, automatic adaption may be used while taking measurements to determine details about position. If there is a square in the center as a pattern, rotation may not be detected well but rotation may be detected better if some pixels in the pattern are turned off. The machine learning may automatically learn how the pattern may be adapted by turning off and on pixels automatically.

The display technologies can be chosen depending on the application that the sensor will be used in and the desired resolution. For example, OLED arrays can be fabricated with (micro-OLED) pixel sizes down to 3 to 10 microns (usually around 5 to 7 microns), while quantum dots can go down to 1.5 to 10 nanometers across. Both of these size ranges can be used advantageously to improve the sensor's capability when turning on and off rows or patterns within rows. There is also the option of turning on one or more pixels with less than full intensity, for example to interpolate an intermediate position. In all cases though, this can either be done in a deterministic (automatic) manner or in an adaptive (e.g. probabilistic) manner.

In addition to improving sensor resolution and reducing or eliminating non-linearity, automatic and adaptive pattern generation may enable numerous additional useful functions or aspects. In one example, the technology may provide the ability to adapt the pattern at the same rate as the sensor is being sampled, which may allow the sensor and system to be used as a null-based sensor (approximate). A null-based sensor is a sensor that seeks to create a situation where the readout remains zero, and adjustments (to the pattern in this case) are used to maintain the zero reading and the measurements of movement are used to generate a displacement reading. In the case of the sensor, a relatively larger pixel size can be used and interpolated to generate substantially higher spatial resolution than the dimensions of a pixel. Effectively, this improves the resolution by reducing the size of the LSB (least significant bit) or the steps between measurements.

In one example, FIGS. 2-5 illustrate the use of four analog photodetector elements in four quadrants. The system (e.g., the transformation process or service) can analyze a balance between linear measurements between two adjacent photo detector elements. If an imbalance is detected, then the transformation process can move the pattern such that the balance returns to zero. In other words, move the pattern to a location where a measurement from photodetector on a first side minus a measurement from a photodetector on a second side is zero. This allows the pattern to be moved back to the center in the null-based mode.

This technology can effectively create a null based sensor by continuing to turn off and turn on different emitter elements (i.e., physical elements). The sensor can then track an amount the position and/or rotation is changed by an amount consistent with the emitter element positions and some small discrepancy measure via the sensor to get the high-resolution displacement measurement. For noise reduction, the emitter elements have a geometric advantage and turning on the appropriate emitters in the array can improve the use of the photo detectors that are available, in this case four in a square grid.

In the null based sensor, the larger pixel sensor element size can be used and interpolated to generate substantially higher spatial resolution than the dimensions of the individual pixel. In a null based sensor, the pattern can be set to a zero position and then a higher resolution can be generated with interpolation between zero and the difference in voltage between two voltage sensors, because a perfect zero will not occur. So, the difference between true zero for the pixel sensors and the measured displacement value is the extra resolution. For example, if two side-by-side pixel sensors are compared, then the difference between the two is a very high-resolution signal that is supposed to be near zero when the zero location is reached. However, the difference output will not be exactly zero because the output is restricted by the width of the emitter pixel(s). The difference value between the two-pixel sensors can be used as additional displacement or resolution and a higher resolution component. For example, there may be a gross displacement measurement (e.g., 0.1 of an inch), but using the additional displacement measurement (e.g., 0.0138 of an inch) then the displacement may actually be a higher resolution measurement (e.g., 0.1 plus 0.01385) which is the actual position. This provides a first level of resolution which uses the pixel size and then a second level of resolution which is which is due to having higher resolution in terms of the difference between the signals of two adjacent pixel sensors or photo detectors. Thus, a difference between pixel sensors can be determined and then that difference may be added or subtracted from the gross pixel measurement.

At some point, as the emitter device keeps turning on and off pixels, emitter device may run out of pixels to turn on that will center pattern back to the center of the sensor. In addition, there is always an assigned range of motion for the sensor. Within the range of motion that has been set, there is also the ability to alter the shape of the emitted light. The locations where the light is coming out of emitter may be changed along with the shape of the pattern. For example, a pattern may be rotated from a diamond back to a square.

Rules may be set in the null based sensor embodiment, which decide how far the pattern can move and/or how much the pattern (e.g., image) may change (e.g., rotate) before the system adjusts the pattern back to the center of the sensor device. The goal is to move the pattern back to the center of the sensor device and use the previous orientation to enable the pattern to operate in the center of the sensor device at the highest resolution. If the pattern reaches a point where the measurements or readout from the sensor device are going to be non-linear then the pattern can be moved back into the center. In one example, the sensor device can sample at one million times (1M) a second and adapt the pattern one million (1M) times a second. Generally speaking, the pattern may move a relatively small amount before the pattern is re-adjusted to the center. However, some tall patterns may need less adjustment from a practical perspective. The sensor device can let the pattern move across the field of view of the sensor device for some defined distance but the transformation processor can keep the pattern in the same orientation and the same translation in the center by continually changing the pattern (i.e., null-based sensors)

There are multiple possible ways of optimizing the pattern using different rules. For example, there may be a set of rules that adjusts the pattern. As a specific example, the processor can keep the edges of the pattern parallel with the translation axis. The pattern may be moved after every sample to keep the two edges parallel to the translation direction. This type of rule works for sensors primarily measuring translation. This rule may not work as well with rotation. For rotation, a pattern may be selected that uses a regular amount of rotation and translation. A good pattern for rotation might use edges that are parallel and parallel curves. This means the processor will use a shape that handles rotation better. When machine learning is used, the machine learning may be learning an optimal pattern in real time. An example of a pattern that works well for rotation, is the trefoil or well-known radiation symbol. Using a pattern that performs well with rotation helps create a linear output rotation sensor.

Another useful pattern to use is high gradient patterns. In one example, every adjacent pixel can be off on the emitter. Alternatively, high gradient patterns can be created with an OLED or multiple small groups of gradient patterns can be created on the emitter device. A pattern which goes from perfectly light to perfectly dark in as short of spatial distance as possible creates a better resolution for the sensor. In fact, the resolution may be orders of magnitude better than with patterns that do not use high gradients.

The pattern can be optimized during use of the sensor device to provide improved resolution, improved S/N ratio and linearity (mostly linear output). The sensor device may be reading from the sensors of the 4 quadrants. In one example, the sensor device and sensor elements can be validated by turning on one row of the LEDs. The single row may be expected to provide a specific output from the sensors of the 4 quadrants. If the result is not what was expected, then the system knows that the pattern emitter and sensor device are not aligned or calibrated properly. Further, the row could be lit up one pixel at a time and then the system may know which direction to go to align or calibrate the sensor device. Other similar calibration patterns can be used.

The ability to self-calibrate is valuable because this sensor device can be more accurate than some existing devices that are more difficult to calibrate. For example, a strain gauge can be difficult to calibrate and have a limited fatigue life. In contrast, the present sensor device is an extensometer that is measuring the extension between two edges or two surfaces. This sensor device can measure strain by the distance traveled but the strain is measured through an extensometer. A strain gauge measures strain by being bonded to a surface and stretching with the material being measured. This sensor device measures movement between two moving surfaces with respect to one another and the dynamic range is much higher by definition. This sensor can have extensions that no strain gauge could ever accomplish. In addition, the sensor material of the present sensor device is not deformed or destroyed, the sensor elements just move back and forth and report movement. Because this sensor device does not need to be externally or separately calibrated, the sensor can be simply attached, self-calibrated and used immediately.

Automatic pattern generation can be applied by adding and subtracting rows (or other similar manipulations) to enhance sensor resolution in the displacement measurement arrangement, where rows are added and subtracted with the result being the ability to establish an interpolated measurement value. This can be thought of as dithering between two known patterns and using this additional information to further enhance the resolution. Dithering is an example of a combination of automatic and adaptive pattern generation. Optical dithering can use an ability to turn on and off pixels near a location, at some frequency, for the application. The light sources on each side of the location can then provide information regarding where things (e.g., the target point) are located. This is due in part to receiving more samples. For example, the system can turn on a whole line of pixels, turn on a partial line of pixels, or turn on a line of pixels partially. Using different ways to provide additional samples may help correct sensor artifacts and quantization errors. Dithering can add to the precision of the system.

With the X and Y axes, the sensor can be zeroed out when the sensor is turned on. When the pixels are turned on, it can be determined that the shape generated is a square. If the square is lined up with the four photo detectors in this example, then it can be determined if the square is centered about a center point and this may result in self-calibrating the sensor. (out of place)

In addition, rows of pixels may be turned off, if a bigger range of motion is wanted for the sensor (and the sensor is not being used as a null based sensor). Another calibration process may be to emulate the sensor working by turning off a row and turning on the row on the other side as though the sensor was moving and this emulated movement can be used to know what happens when the sensor moves. So, control of the emitters may allow calibration of the sensor without actually having to use external information or move the sensor. This is possible because the lithographic methods are precise and the location of the lines of the emitters are known in advance. The information inherent in the system can be used to avoid needing to use information external to the system for calibration and this avoids having to move the sensor for calibration.

Further, an absolute position between the light sensitive components of the sensor and the emitter (i.e., image presentation component or pattern generator) can be easily determined because the location of the illuminated rows and columns is known. Absolute in this case means that the sensor could be turned off for a month, and then when the sensor is turned back on, the last pattern used is known and so the sensor knows where the current location of the emitter is. The system can just store the last pattern used (e.g., the last configuration and location) and the sensor is ready for use. If the sensor were moved, the sensor can report that information.

As an example, individuals often want to track the motion of a glacier, the motion of the ground moving with respect to another point across a geologic fault, train track monitoring or monitoring movement of a bridge. The sensor may be one each side of the area or surfaces desired to be measured. It is possible to come back and interrogate the system in a month to see whether one part moved with respect to another part. All the information is available to know how the sensor was positioned at the last reading and where the sensor is now. In the past, where a resistance sensor might have been used for this type of reading, obtaining an absolute reading is straight forward as compared to a resistance sensor which is not very precise. However, a resistance sensor (e.g., a potentiometer (POT)) is absolute in the sense that when you turn the resistance sensor on it is possible to tell if something changed. Digital sensors typically are not typically absolute sensors. An example of this is rotary encoders. Unless a rotary encoder is specifically designed to create an absolute reading, then the digital rotary encoder does not remember its position but typically provides a relative reading when the rotary encoder is on. In contrast, with the present sensor, the sensor records the pattern's exact location when the sensor is turned off. From the point of view of the signal received and knowing the pattern used to generate that signal, how far the sensor was moved since the last reading can be determined.

The ability to provide an absolute digital sensor device is useful. Many years ago, all analog sensors were absolute, but the world changed with higher resolution digital sensors which provide incremental readings versus absolute readings. There can be tricks to make digital incremental sensors more absolute in some way but these methods can be complicated and/or burdensome. In the applications such as monitoring bridges, seismic activity or a number of other geologic or sensitive types of sensors, the desire for absolute measurements is great. However, leaving the sensor on constantly is not desirable because sensor devices generally do not store large amounts of energy (e.g., limited batteries are used) or otherwise the sensors become more expensive. However, it is useful to have hundreds of thousands of sensors and then the sensors can be interrogated only when needed. So, the need for absolute readings is quite useful in a large collection of applications for preserving battery life. This technology may provide a sensor that is absolute but when the sensor is not actually active (e.g., turned on) the battery source can last for many years (e.g., seven or eight years), as long as frequent sensor readings do not drain the batteries. The present sensor device may have an onboard rotating buffer with the last position stored and a non-volatile memory (e.g., FlashRAM) that provides position when the sensor is turned on.

The ability to change the pattern in real-time also allows the sensor to be self- or auto-calibrated, for example pixels of the emitter can be commanded by the transformation process or service to change intensity individually and step-by-step between intensities. The sensor or sensing component can measure those changes, which in turn are transmitted back to the transformation service. The transformation service can then generate an exact map of what is expected from the sensor for any pattern in any position.

There are an infinite number of translation and rotation possibilities, but the sensor process remains the same for all the translation and rotation possibilities. The re-adjustment of the pattern may occur every time the sensor data is sampled or the re-adjustment may occur only when the pattern reaches certain boundaries or thresholds, including a certain change in the gain slope.

The translation service can be programmed with a set of prioritization rules. For example, if the primary purpose of the sensor is to measure torque, then rotation can be prioritized over translation and the transformation service may orient the pattern to have the highest resolution and highest linearity in rotation. On the other hand, if the sensor is measuring a load, then translation along the x- and/or y-axis may be the most important and the detection service may select a pattern that has the highest resolution and most linear output along these axes.

The transformation process may select patterns from a pre-existing pattern library or generate the patterns using AI or ML techniques. The pre-existing library may be accessed through a computer network (e.g., online through the internet or local area network (LAN)) or saved locally in the transformation process. Any technology that can generate a pattern under computer control can be output using the emitter. For example, the pattern may be generated by an AI or ML technique based on previous data or rules stored in the transformation process or stored in a separate location or a cloud. The rules for generating a pattern can come from a rules library, can be established by the user, can be established by the user by answering a questionnaire, can be extrapolated from the most recent displacement(s), or can be learned using AI or ML techniques Accordingly, this sensor device can provide active pattern generation for an optical displacement/torque/force measurement sensor. This may occur in multiple ways. For example, a pattern may be dynamically modified to provide improved resolution, SNR, and linearity. The pattern modifications can also use the most recent actual displacement distance or volume. The pattern modifications may occur using AI/ML generated patterns.

For applications where one or more of the sensing axes (for example rotation around the x and y axes) are intended to remain constant by design, then the correct orientation of the light sensitive component of the sensor with respect to the emitter can be determined by detection of axis orthogonality. This enables autocalibration of the sensor after manufacture. For example, the correct orientation of a light-sensitive component of the sensor can be determined by the detection of the axis orthogonality. More specifically, this means the sensor and emitter can be tested to determine whether the sensor and emitter are orthogonal. If the sensor is intended to measure movement in the x-axis and not in the y- or z-axes, then the sensing component may not be perfectly parallel. If the sensor were perfectly manufactured, the sensor or sensing component and pattern output or emitter components may have parallel planes. However, there will generally be some offset (e.g., cocking) at the nanometer scale. This may include a rotation around the x or y axis, or rotation around may be around the z-axis. It is possible to correct for non-orthogonality by adjusting the shape of the image, but the system may determine if the pattern is so far out of alignment that it does not make sense to shift the pattern.

In one example, if a normal vector to the plane of the emitter is identified, this normal vector may not intersect with a plane of the sensor at a normal angle. This may result in a non-orthogonality in the sensor. A determination may be made as to whether a portion of the emitter device plane is parallel to the sensor device plane. Then the pattern can be changed to account for any lack of non-orthogonality. In other words, the system can detect when the Z-axis is at a different rotation between the emitter and sensor and the X and Y planes are properly placed. As a result, a feedback loop can be provided to change the pattern dynamically depending on the non-orthogonality. If there is a different rotation around the Z-axis of the emitter vs. the sensor then this feedback can be used to keep the square on the quadrant on the detector in the right place or to physically align elements of the sensor together.

The squareness of the emitter should preferably line up with the squareness of the detector. For example, a row can be toggled on and off and this provides a more accurate interpolation of the location of that row. The sensor output can be analyzed to determine whether the expected output from a line of pixels is received or whether the output is less than expected. This can be done on any location on the sensor (e.g., top, bottom or side to side sensor areas). The row of pixels may be a horizontal line or the vertical line, or a whole area of the emitter device may be activated. Pixels can be turned on when the emitter pixels are within the boundaries of the detectors, and the analysis can be performed to see whether there is a balance in the output or not. If there is an imbalance, then the sensor is out of rotation by some amount.

Lack of orthogonality in the present technology is rotation around an axis that is undesirable for operation of the sensor device. Unwanted rotation can be measured and compensation can be made for the unwanted rotation. In another example, a line of light can be lit up on the emitter, then the sensor device can be tested for a symmetry in the directions expected to determine if the emitter and sensor are or are not square with each other. Similarly, multiple rows can be used or rows with pixels can be added sequentially. This can provide a ramp of light output. When using the OLED and the quantum dots, the addresses of each of the pixels is known and their location in space is known. This enables a calibration by testing whether the sensors in the emitter are receiving the expected amounts of light. If not, then certain detected areas may not be square with each other.

Generally speaking, because the sensor device has an address for every pixel of the emitter, this can provide absolute sensing in the sensor device. This is not the relative position between the emitter and sensor. This absolute sensing allows the sensor to be turned off and back on and the sensor device will still know the position of the sensor.

Automatically generated patterns can be used for calibration and self-calibration. The sensor device can execute these pre-determined sequences of patterns to find out where the sensor device is more sensitive and less sensitive. These sequences may be prepared in advance and then used for a self-calibration sequence.

There may also be different types of pattern generation functions. One type of function is an adaptive function where machine learning can modify the location and/or orientation of the pattern on the emitter or modify the shape of the pattern being used.

Another type of function can be adaptive for a specific emitter type. If the machine learning (ML) component (e.g., transformation process) is used with the sensor, then that lets the sensor optimize itself for any type of emitter. The ML component can design a desirable or useful emitter pattern for the emitter type. Further, the ML component can design a robust emitter pattern for each movement sequence the sensor device may be used with. These movement sequences may be created for robots or other machinery. This allows an emitter pattern to be created that is application specific and/or situationally specific.

The ML component can be used to sort out the noise from the signal. The ML component knows what the output should look like and this may assist with measuring and/or filtering the noise. In a machine or robot, a command may be received for a joint to move and the sensor device may be used to measure the movement of the joint.

Some of the valuable results of the present technology can include improved SNR (signal-to-noise) ratio, sensor gain, sensor resolution, and linearity. Using dynamic pattern adaptation by changing static patterns to optimize resolution can improve sensor resolution by two to three orders of magnitude.

Figure 8:
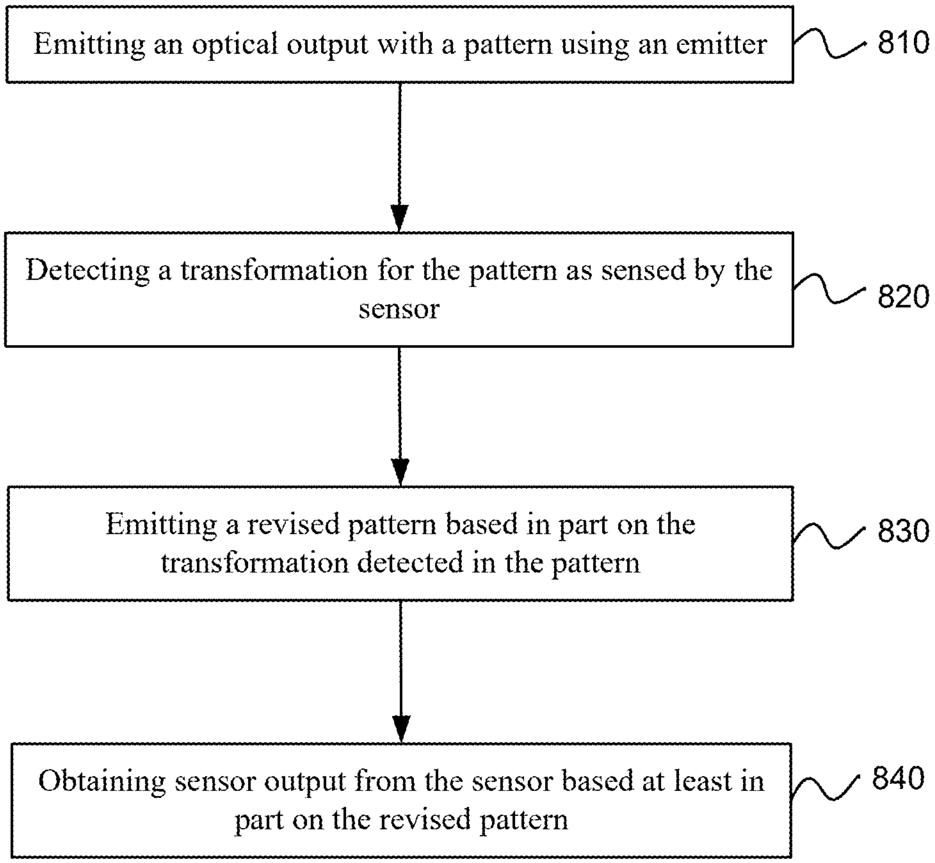
FIG. 8 is a flow chart of a method for adaptive pattern generation for a sensor.

FIG. 8 is a flow chart of a method for adaptive pattern generation for a sensor. The method may include emitting an optical output with a pattern using an emitter, as in block 810.

A transformation for the pattern may be detected as sensed by the sensor, as in block 820. The transformation is a change in pattern translation or rotation. The translation or rotation is due to movement of the emitter or sensor (or both) that uses translation or rotation. In addition, the pattern is tracked as the pattern is going across the sensed area of the sensor device. The pattern may be tracked by comparing the new position with the old position of the pattern. This means that the displacement of the pattern can be tracked in terms of translation and/or rotation.

A revised pattern may be emitted based in part on the transformation detected in the pattern, as in block 830. The revised pattern may be generated using sensing rules and changing a pattern location or rotation to increase at least one of sensor gain or sensor sensitivity. The optical output of the emitter may be: ultraviolet (UV) radiation, visible (VIS) light, infrared (IR) radiation or another detectable output of the emitter.

Sensor output may be obtained from the sensor based at least in part on the revised pattern, as in block 840. The pattern may be changed at a rate equal to or greater than a sampling rate of the sensor.

In one configuration, a zero reading from the sensor may be maintained by translating or rotating the pattern to the pattern's original orientation and centering the pattern on the sensor on a periodic basis to obtain a null-based sensor. In other words, when the pattern output by the emitter is rotated and/or translated, the pattern can be moved back to the original position the pattern was in, if a null based sensing mode is being used.

This technology can provide active pattern generation for an optical displacement, torque and force measurement sensor. In addition, the sensor can be used to measure a number of different types of forces through displacement. The sensor types may include measuring position, strain, force, load, velocity, acceleration, torque, pressure, sound, vibration, stress, moments, sheer, vibration, and flow which may include direction, velocity and acceleration in one or more directions, a rate of rotation, a rotation angle, at least one of multi-axis forces or moment, or other forces. This sensor device may measure displacement using transformations of the patterns or adaptive pattern generation. The pattern may be actively adapted or modified at the megahertz speed or higher, if desired. The signals from the pixel sensors, when analog sensors are used, also do not have to be sent through a processor so the signals are received immediately upon the light being detected.

The use of machine learning generally means that the system has knowledge about the prior behavior of the system, in order to make informed guesses about the future. In addition, customization may be made based on the operating environment. If the environment is in a ship, then the sensor device may know that the vibrational range of surface or edges being detected is between 5 Hz and 30 Hz, as an example. This guides the parameters that the sensor can typically expect to see on the wall near the engine room. By knowing that normal operation sees the vibrational range of a specific range and that information can be used as an expectation for the range of calibration, to make the sensor the most sensitive possible. For instance, the sensor device can improve the signal-to-noise ratio by expanding the pixel array that is illuminated to the greatest extent possible but where the sensor does not go out of range and the sensor device now has the largest signal based on prior experience. There are some risks with such expansion, such as what if an excursion occurs that was not there before. But an excursion can be compensated for by intelligently reducing the amount of the array used and it is noted that the pixel emitter went off the sensor device. The photodetector can be used to determine when the emitter when to the edge of the photodetector where an excursion detection was made. If based on prior experience, the sensor device determines the emitter can be made much larger than normal because the actual displacement seen in this working environment is smaller than typically used that can be useful sensor operation information. For instance, the sensor device may also determine the x-axis is displacing more than the y-axis so you can modify both of them accordingly where to make the one axis a little bit smaller (e.g., the one that's going to have the larger excursions) and the other axis larger because it's having the smaller excursions. This example ties back to machine learning in terms of use where the system can make a prediction of what the service range of motion will be so that the sensor can be modified to the highest resolution and improve the signal-to-noise ratio.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A method for adaptive pattern generation for a sensor, comprising:
- emitting an optical output with a pattern using an emitter;
- detecting a transformation for the pattern as captured by the sensor;
- changing the pattern at a rate equal to or greater than a sampling rate of the sensor;
- emitting a revised pattern based in part on the transformation detected in the pattern; and
- obtaining sensor output from the sensor based at least in part on the revised pattern.

2. The method as in claim 1, wherein the transformation is a change in pattern translation or rotation.

3. The method as in claim 1, further comprising generating the revised pattern by changing a pattern location or rotation to increase at least one of sensor gain or sensor sensitivity.

4. The method as in claim 1, further comprising maintaining a zero reading from the sensor by translating or rotating the pattern to the pattern's original orientation and centering the pattern on the sensor on a periodic basis to obtain a null-based sensor.

5. The method as in claim 1, wherein the optical output is at least one of: ultraviolet (UV) radiation, visible (VIS) light or infrared (IR) radiation.

6. A method for adaptive pattern generation for a sensor, comprising:
- emitting a pattern using an emitter of the sensor to provide an optical output;
- detecting a transformation of the pattern using the sensor;
- changing the pattern to a revised pattern at a rate equal to or greater than a sampling rate of the sensor, and based in part on the transformation detected for the pattern, to improve sensor output;
- emitting the revised pattern using the emitter to provide the revised pattern as a revised optical output; and
- generating sensor output from the sensor based in part on the revised pattern.

7. The method as in claim 6, wherein the transformation is a change in pattern location or rotation.

8. The method as in claim 6, further comprising generating the revised pattern by changing pattern location or rotation to increase sensor gain.

9. The method as in claim 6, further comprising maintaining a zero reading from the sensor by translating or rotating the pattern to its original orientation and centering the pattern on the sensor on a periodic basis to obtain a null-based sensor.

10. The method as in claim 6, wherein sensor output further includes at least one of: maximizing signal output, maximizing a ratio between an input and output, maximizing signal-to-noise ratio (SNR) along a desired axis or axes consistent with provided rules, or producing a linear output.

11. The method as in claim 6, further comprising changing the pattern by at least one of: dithering the pattern, changing a number of rows in the pattern, changing a shape of the pattern, moving the pattern or rotating the pattern.

12. The method as in claim 6, further comprising determining orthogonality of the sensor by displaying a pattern used to test orientation of the emitter with respect to the sensor.

13. The method as in claim 12, wherein the pattern used to test orthogonality is at least one of: a horizontal line, a vertical line, a rectangular area, an oval, an asymmetric shape, or a pattern comprising at least one of these.

14. The method as in claim 6, further comprising determining an absolute position between the emitter and the sensor using known positions of light emitting elements of the emitter.

15. The method as in claim 6, further comprising auto-calibrating the sensor by changing the pattern emitted by the emitter.

16. The method as in claim 15, wherein changes to the pattern emitted for auto-calibrating the sensor are based on at least one of: changing individual light element intensities or checking pixel illumination.

17. The method as in claim 6, wherein the emitter is in contact with the sensor or the emitter is spatially separated from the sensor.

18. The method as in claim 6, wherein the optical output is at least one of: ultraviolet (UV) radiation, visible (VIS) light or infrared (IR) radiation.

19. The method as in claim 6, wherein the pattern is a high gradient pattern.

20. A system for adaptive pattern generation, the system comprising:

an emitter;

a sensor;

at least one processor;

a memory device including instructions that, when executed by the at least one processor, cause the system to:

emit a pattern using the emitter of the sensor to provide an optical output;

detect a transformation of the pattern using a sensor;

change the pattern to a revised pattern at a rate equal to a sampling rate of the sensor, and based in part on the transformation of the pattern detected, to improve sensor output;

emit the revised pattern using the emitter to provide the revised pattern as a revised optical output; and generate sensor output from the sensor based in part on the revised pattern.

21. The system as in claim 20, wherein transformation of the pattern is a change in pattern location or rotation.

22. The system as in claim 20, further causing the system to generate the revised pattern using sensing rules and the change in pattern location or orientation to increase sensor gain.

23. The system as in claim 20, further causing the system to maintain a zero reading from the sensor by translating or rotating the pattern to its original orientation and centering the pattern on the sensor on a periodic basis to obtain a null-based sensor.

24. The system as in claim 20, wherein the sensor output further includes at least one of: increased signal output, maximizing a ratio between an input and output, maximizing signal-to-noise ratio (SNR) along a desired axis or axes consistent with provided rules, producing a linear output or producing a more linear output.

25. The system as in claim 20, further causing the system to change the pattern by at least one of: dithering the pattern, changing a number of rows in the pattern, changing a shape of the pattern, moving the pattern or rotating the pattern.

26. The system as in claim 20, further causing the system to determine orthogonality of the sensor by displaying a pattern used to test orientation of the emitter and the sensor.

27. The system as in claim 20, wherein a pattern used to test orthogonality may be a horizontal line, a vertical line, or a rectangular area, or any known shape that is asymmetrical in the width versus length.

28. The system as in claim 20, further causing the system to determine an absolute position between the emitter and the sensor using known positions of light emitting elements of the emitter.

29. A method for adaptive pattern generation for a sensor, comprising:

emitting a pattern using an emitter of the sensor to enable the emitter to display the pattern and emit a light output;

detecting a transformation in pattern location or rotation using a sensor;

changing the pattern to a revised pattern based in part on the change in pattern location or rotation detected and using a transformation process to determine an aspect of changing the pattern, wherein the pattern may be changed to a pattern shape that provides increased sensor signal to noise ratio (SNR) or increased linear output;

sending the revised pattern to the emitter to display the revised pattern and emit a revised light output; and receiving sensor output from the sensor based in part on the revised pattern.

30. The method as in claim 29, wherein the transformation process uses a rules engine or machine learning to determine an aspect of changing the pattern.

31. The method as in claim 29, wherein the transformation process uses machine learning to determine a shape, rotation amount or translation vector for transforming the pattern.

32. The method as in claim 29, further comprising generating the revised pattern using changes in pattern location or orientation to increase sensor gain or sensitivity.

33. The method as in claim 29, wherein a size of the emitter or pattern is set by machine learning in the transformation process based in part on training data representing previous movement of the sensor.

34. The method as in claim 29, wherein the emitter and sensor move with respect to each other to provide sensing.

35. A method for adaptive pattern generation for a sensor, comprising:

emitting a pattern using an emitter of the sensor to provide an optical output;

auto-calibrating the sensor by changing the pattern emitted by the emitter, wherein changes to the pattern emitted for auto-calibrating the sensor are based on at least one of changing individual light element intensities or checking pixel illumination;

detecting a transformation of the pattern using the sensor;

changing the pattern to a revised pattern based in part on the transformation detected for the pattern, to improve sensor output;

emitting the revised pattern using the emitter to provide the revised pattern as a revised optical output; and generating sensor output from the sensor based in part on the revised pattern.

* * * * *